US006601288B2

(12) United States Patent
Becherucci et al.

(10) Patent No.: US 6,601,288 B2
(45) Date of Patent: Aug. 5, 2003

(54) PRODUCTION OF DYNAMO-ELECTRIC MACHINE STATOR COILS HAVING LEADS AT FINAL ATTACHMENT POINTS BEFORE INSERTION INTO A STATOR CORE

(75) Inventors: Raffaele Becherucci, Florence (IT); Gianfranco Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 10/290,410

(22) Filed: Nov. 7, 2002

(65) Prior Publication Data

US 2003/0061708 A1 Apr. 3, 2003

Related U.S. Application Data

(62) Division of application No. 09/522,228, filed on Mar. 9, 2000, now Pat. No. 6,557,238.
(60) Provisional application No. 60/124,226, filed on Mar. 12, 1999.

(51) Int. Cl.[7] ............................................... H02K 15/04
(52) U.S. Cl. ........................ 29/596; 29/732; 29/605; 242/433
(58) Field of Search .................... 29/596, 598, 732, 29/605, 606; 242/433; 310/179, 198, 208

(56) References Cited

U.S. PATENT DOCUMENTS

| | | | |
|---|---|---|---|
| 3,748,714 A | * | 7/1973 | Kieffer ........................ 29/732 |
| 4,477,966 A | | 10/1984 | Napierski |
| 4,723,354 A | | 2/1988 | Moser |
| 5,065,503 A | | 11/1991 | Luciani et al. |
| 5,245,748 A | | 9/1993 | Luciani et al. |
| 5,291,649 A | | 3/1994 | Lombardi et al. |
| 5,454,156 A | * | 10/1995 | Morr ............................ 29/596 |
| 5,535,503 A | * | 7/1996 | Newman ...................... 29/596 |
| 5,542,456 A | | 8/1996 | Nishimura et al. |
| 5,947,404 A | | 9/1999 | Dolgas et al. |
| 6,009,618 A | | 1/2000 | Takahata et al. |
| 6,230,388 B1 | | 5/2001 | Simon |
| 2001/0013167 A1 | | 8/2001 | Maeda et al. |

FOREIGN PATENT DOCUMENTS

| | | |
|---|---|---|
| EP | 0 963 031 A2 | 12/1999 |
| JP | 07059306 | 3/1995 |

* cited by examiner

*Primary Examiner*—Gregory Vidovich
*Assistant Examiner*—Stephen Kenny
(74) *Attorney, Agent, or Firm*—Fish & Neave; Garry J. Tuma

(57) ABSTRACT

Methods and apparatus are presented that improve the efficiency of stator production by connecting stator coil leads to final attachment devices before the coils are inserted into a stator core. After coil insertion, the final attachment devices are merely mounted to the stator receiving the stator core, eliminating most if not all post-coil-insertion lead identification and manipulation processes. The final attachment devices can be terminal receivers that include a plurality of wire sockets for receiving a plurality of coil leads. Coil leads are connected to final attachment devices during the coil winding stage. Such connections add little or no additional time to the winding stage.

10 Claims, 4 Drawing Sheets

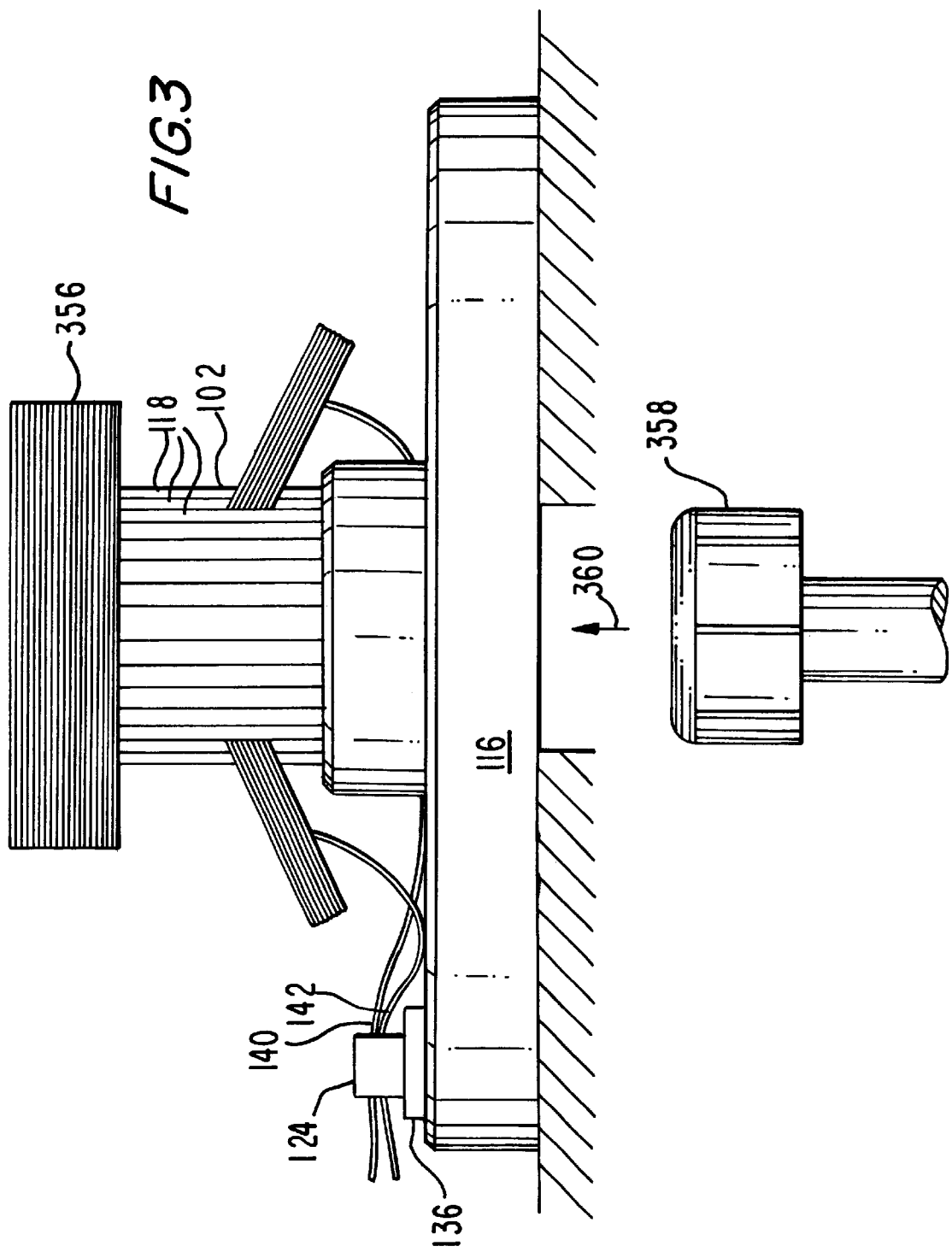

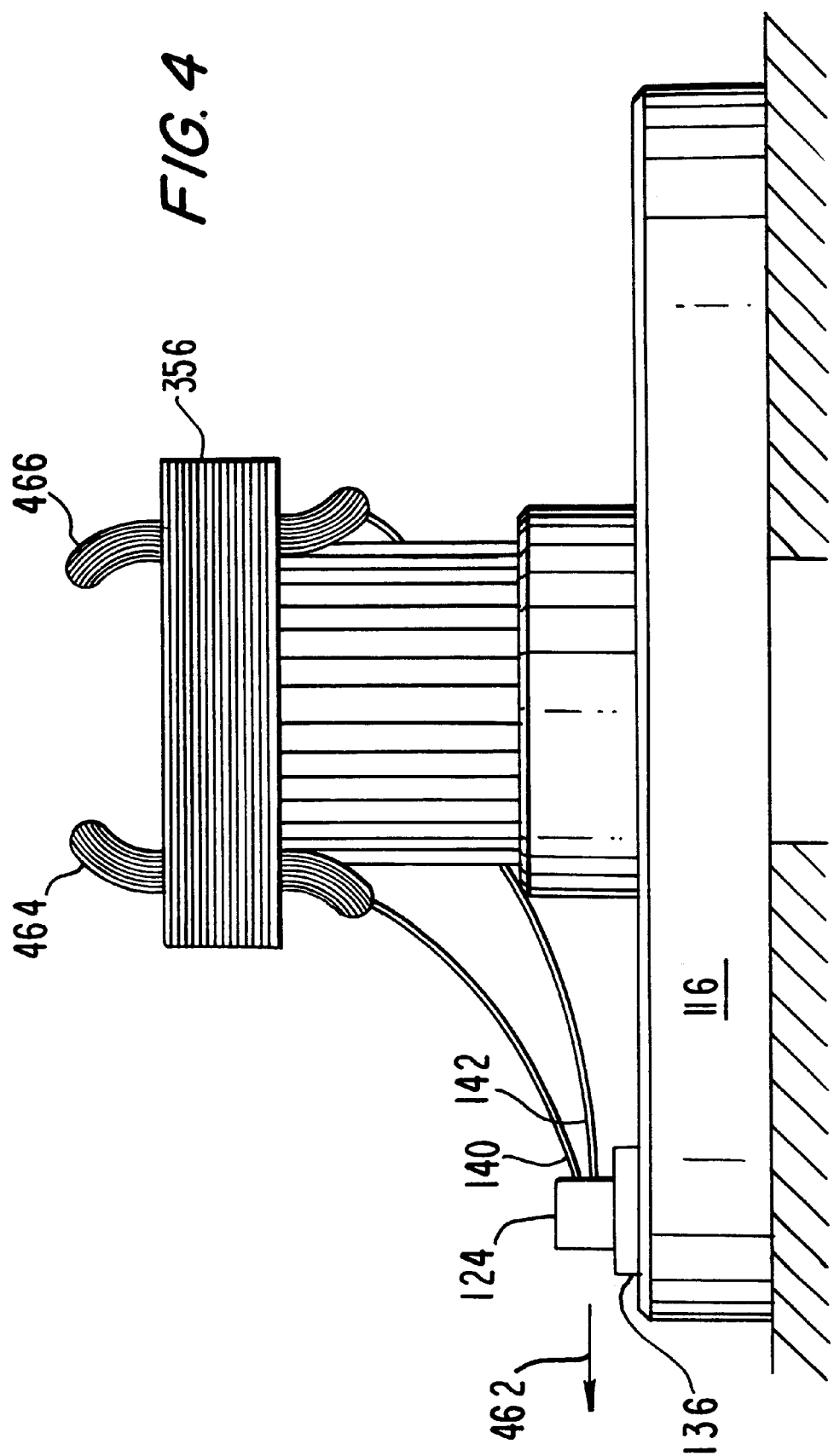

PRODUCTION OF DYNAMO-ELECTRIC MACHINE STATOR COILS HAVING LEADS AT FINAL ATTACHMENT POINTS BEFORE INSERTION INTO A STATOR CORE

CROSS REFERENCE TO RELATED APPLICATIONS

This is a divisional of commonly assigned U.S. patent application Ser. No. 09/522,228, filed Mar. 9, 2000, now U.S. Pat. No. 6,557,238, which claims the benefit of U.S. Provisional Patent Application No. 60/124,226, filed Mar. 12, 1999.

BACKGROUND OF THE INVENTION

This invention relates to production of stator coils for dynamo-electric machines. More particularly, this invention relates to production of stator coils in which the initial and final leads of each coil are connected to final attachment points before the coils are inserted into a stator core.

Conventionally, a stator coil is wound on a template by a rotating flyer arm through which coil wire is delivered. The coil is then transferred from the template to a coil-holding tool, which may be a transfer tool or a coil insertion tool. Both include a series of upright members circumferentially positioned on the base of the tool. The sides of each coil are placed in the spacings between predetermined upright members. Optionally, coil leads can be temporarily anchored to a retaining or anchoring device to later facilitate lead identification.

If the coil-holding tool is a transfer tool, the coils are transferred to a coil insertion tool typically located at an insertion station. The upright members of the coil insertion tool are commonly regularly-spaced insertion blades. A stator core is positioned on top of the insertion blades with the stator slots into which the coils are to be inserted aligned with the spacings containing the coils. A pusher device then transfers the coils from the insertion tool to their final positions within the stator slots. The pusher device typically also inserts wedges into the stator slots to cover the coils.

Each coil has an initial and final lead. After insertion of typically many coils into a stator core, each lead of each coil is individually identified and manipulated for connection to a final attachment point. In those cases where leads are not temporarily anchored, lead identification can be particularly difficult considering the typically dozens of dangling and often entangled coil leads associated with most stators. Lead manipulation can include routing a lead to a particular attachment point, such as, for example, a wire socket of a terminal receiver or a connection to another coil lead, where the two leads are usually crimped with an insulating sleeve. Typically, coil leads are routed by running them along the end portions of the coil from which they originate. Lead manipulation can also include lacing leads around end portions of coils to fix the positions of the leads for later internal or external stator connections. Lead manipulation can further include bundling several identified leads together and then soldering them to form a single lead connection point. After the coil leads are connected to their final attachment points, connections to electrical conductors or components external to the stator are usually made.

These post-coil-insertion processes (i.e., lead identification and manipulation) are often performed manually or, if coil leads are temporarily anchored (which facilitates lead identification), these processes are sometimes performed automatically. In either case, lead identification and manipulation processes are time-consuming, often inefficient (particularly when performed manually), and usually require additional equipment or machinery and additional processing steps (particularly when performed automatically).

In view of the foregoing, it would be desirable to improve the efficiency of stator production by producing stator coils having leads automatically connected to final attachment points before the coils are inserted into a stator core.

SUMMARY OF THE INVENTION

It is an object of this invention to improve the efficiency of stator production by producing stator coils having leads automatically connected to final attachment points before the coils are inserted into a stator core.

In accordance with this invention, methods and apparatus are provided that connect multiple wire leads of multiple coils to one or more devices comprising final attachment points of the leads before the coils are inserted into a stator core. Apparatus includes coil winding apparatus, a coil-holding tool, a platform for supporting the coil-holding tool, at least one final attachment device, and a lead gripper device that can grasp a wire from the coil winding apparatus and connect it to a final attachment device. Methods include winding a wire to form a coil, connecting a lead of the coil to a final attachment device, loading the coil onto a coil-holding tool, and repeating the above at least once. Coils that have been loaded onto the coil-holding tool are then inserted into a stator core. The transfer of coils from the coil-holding tool to the stator core is direct if the coil-holding tool is a coil insertion tool. Otherwise, the coils are transferred first from the coil-holding tool to a coil insertion tool. Lastly, the final attachment device can be mounted to a stator receiving the stator core. Advantageously, post-coil-insertion lead identification and manipulation are substantially unnecessary. Moreover, the time required to automatically connect wire leads to a final attachment device is substantially the same as or less than the time required in known processes to temporarily anchor leads to an anchoring device. Accordingly, stator production efficiency is improved.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 3 is a diagrammatic elevational view of the apparatus of FIG. 1 at another stage of operation according to the invention; and FIG. 4 is a diagrammatic elevational view of the apparatus of FIG. 1 at a further stage of operation according to the invention.

DETAILED DESCRIPTION OF THE INVENTION

The present invention improves the efficiency of stator production by providing methods and apparatus that connect multiple wire leads of multiple coils to final attachment points before the coils are inserted into a stator core. This significantly simplifies and shortens post-coil-insertion processes and adds little or no additional time to the coil winding and insertion processes. In particular, post-coil-insertion lead identification and manipulation are substantially unnecessary. After the insertion of coils into a stator core, the mounting of one or more final attachment devices to the stator completes most, if not all, coil lead identification and manipulation processes. Once the final attachment devices have been mounted, external connections to the stator can be made. The overall efficiency of stator production is thus notably improved.

Figure 1:
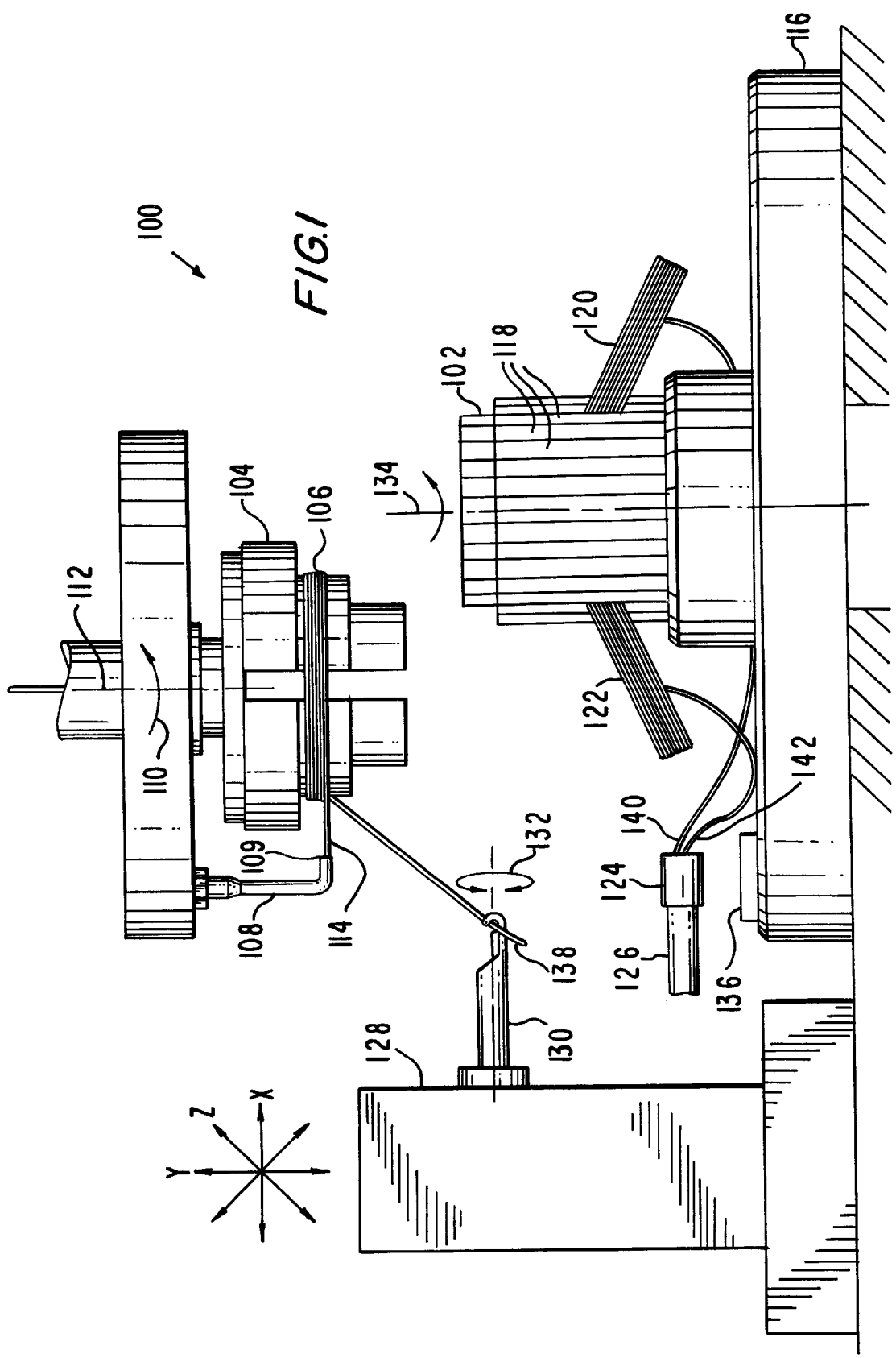
FIG. 1 is a diagrammatic elevational view of a preferred embodiment of apparatus at a winding stage of operation according to the invention.

FIG. 1 shows a preferred embodiment of apparatus 100 at a winding stage of operation in accordance with the principles of the present invention. Preferably, coil insertion tool 102 is positioned beneath template 104. Wire coil 106 is wound on template 104 preferably by flyer arm 108. Flyer arm 108 rotates in direction 110 around vertical axis 112. As flyer arm 108 rotates around axis 112, it delivers wire 114 around template 104 from a nozzle 109 to form a predetermined number of turns of coil 106. To ensure that the turns of coil 106 are sufficiently taut around template 104, preferably a tensioner (not shown, but known in the art) applies tension to wire 114 as it is being delivered. Alternatively, apparatus 100 can include instead a rotating template and a stationary arm with a nozzle that delivers wire.

Coil insertion tool 102 preferably is fixed preferably to pallet 116, and preferably includes upstanding insertion blades 118 positioned circumferentially on pallet 116. Blades 118 preferably are regularly-spaced to receive the sides of wound coils, such as, for example, the sides of coils 120 and 122 as shown. Coils 120 and 122 were each formed on template 104 and placed between predetermined insertion blades 118 by a stripping device (not shown, but known in the art). Alternatively, coil insertion tool 102 can include instead other known types of circumferentially positioned members that can receive and hold coils from template 104.

Alternatively, a transfer tool can be used instead of coil insertion tool 102 at the winding stage. Transfer tools are commonly used in stator production processes that are less automated. A transfer tool typically is a simpler, less expensive device whose circumferentially positioned members typically comprise circular rods that can hold coils. After being loaded with coils, the transfer tool typically is transported to an insertion station where the coils are loaded onto a coil insertion tool, which is similar to insertion tool 102. The transfer tool and coil insertion tool 102 are both coil-holding tools.

Apparatus 100 also preferably includes at least one terminal receiver 124 that becomes the final attachment point for wire leads of coils connected to terminal receiver 124. Terminal receiver 124 is preferably lightweight and has multiple wire sockets in which multiple wire leads can be inserted, retained, and electrically connected to other electrical conductors. Although not preferable, more than one wire lead can be inserted into a single wire socket. Terminal receiver 124 can be provided with wire sockets electrically isolated from each other or, alternatively, with wire sockets electrically interconnected to each other in any combination. One or more terminal receivers 124 can be introduced during the coil winding stage preferably by a gripper 126, the construction of which is known in the art. Gripper 126 grasps individual terminal receivers 124 preferably from a nearby supply bin (not shown), and supports a terminal receiver 124, as shown in FIG. 1, preferably during the coil winding stage.

Apparatus 100 further includes a lead gripper 128, which is a device that forms and positions initial and final coil leads. Lead gripper 128 can be, for example, the lead wire handling apparatus disclosed in U.S. Pat. No. 5,065,503, which is hereby incorporated by reference herein. Lead gripper 128 preferably includes wire handler 130 that can grasp wire 114 from flyer arm 108 and insert the wire into a wire socket of terminal receiver 124. Wire handler 130 includes a hook and rod mechanism in which a hook portion engages wire 114 and a push rod yieldably bears against wire 114 and the inner hook portion. Lead gripper 128 preferably operates wire handler 130 with a controlled grasping action. Wire handler 130 preferably can move in three dimensions (i.e., in X, Y, and Z axes). Also, wire handler 130 preferably can rotate preferably at least about 180° in the directions shown by double-headed arrow 132. Wire handler 130 preferably also includes a lead insertion rod (not shown) that ensures that wire 114 is securely inserted into a wire socket. Wire handler 130 preferably further includes a wire cutter (not shown).

Pallet 116 preferably rotates about axis 134 to position coil insertion tool 102 as required for receiving coils from template 104. Pallet 116 also preferably rotates to align terminal receiver 124 with wire handler 130. Pallet 116 includes at least one seat 136 that can seat terminal receiver 124. Alternatively, insertion tool 102 can be supported instead by a platform or other similar structure that also preferably rotates and that can be integral with the winding station.

Apparatus 100 preferably operates as follows: wire handler 130 holds initial lead 138 of wire 114 before coil winding begins. Wire handler 130 inserts initial lead 138 in a wire socket of terminal receiver 124 either before flyer arm 108 begins rotating or after a certain number of turns of coil 106 have been wound. Preferably, gripper 126 supports terminal receiver 124 while leads are inserted. Alternatively, terminal receiver 124 also can receive leads while seated in an embodiment of seat 136 that sufficiently holds terminal receiver 124 in place.

After coil 106 has been fully wound on template 104, wire handler 130 grasps and inserts the wire extending from the final turn of coil 106 (which when cut will become the final lead of coil 106) either into the same or another wire socket of the same terminal receiver 124 or, alternatively, into a wire socket of another terminal receiver 124, as predetermined by stator specifications. Thus, multiple terminal receivers 124 can be used during the winding of coils for a stator.

As wire handler 130 inserts the wire extending from coil 106 into terminal receiver 124, additional wire is drawn from flyer arm 108. This additional wire is preferably of a predetermined length and is at least sufficient to prevent inserted leads from pulling out of terminal receiver 124 while pallet 116 rotates. Furthermore, the additional wire sufficiently extends between flyer arm 108 and wire handler 130 to begin winding another coil on template 104 when the wire is cut.

Wire handler 130 preferably cuts the wire from terminal receiver 124. This frees coil 106 from flyer arm 108. Coil 106 is then stripped off template 104 and loaded onto insertion tool 102. As shown in FIG. 1, coils 120 and 122 have been loaded onto insertion tool 102 with respective initial leads 140 and 142 inserted into terminal receiver 124 (for clarity, final leads of coils 120 and 122 are not shown).

Alternatively, fully wound coil 106 first can be stripped off template 104 and loaded onto insertion tool 102 before wire handler 130 grasps and inserts the wire extending from the final turn of coil 106 into a wire socket of terminal receiver 124. Wire handler 130 can then cut the wire from terminal receiver 124.

Gripper 126 places terminal receiver 124 in seat 136 in accordance with stator specifications for the coils being wound. This can occur, for example, after a specified number of leads have been inserted in terminal receiver 124, or after a specified number of coils has been loaded onto insertion tool 102. Alternatively, gripper 126 can simply place terminal receiver 124 in seat 136 before any lead insertion occurs.

Pallet 116, carrying coil insertion tool 102 loaded with coils and one or more terminal receivers 124, is transferred preferably to an insertion station to insert the coils into a stator core. Alternatively, in the case of a non-portable platform used instead of pallet 116, other known mechanisms or a human operator transports insertion tool 102 and terminal receivers 124 preferably to an insertion station.

Figure 2A:
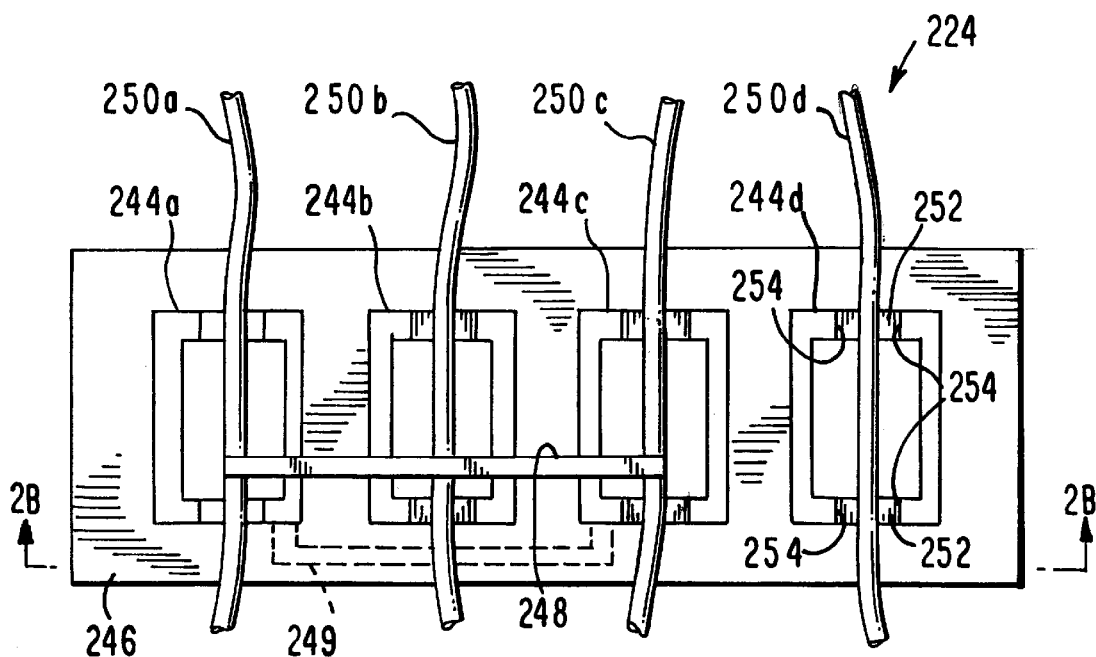
FIGS. 2A and 2B are plan and elevational views, respectively, of an embodiment of a terminal receiver of FIG. 1 according to the invention (FIG. 2B is taken from line 2B—2B of FIG. 2A)
Figure 2B:
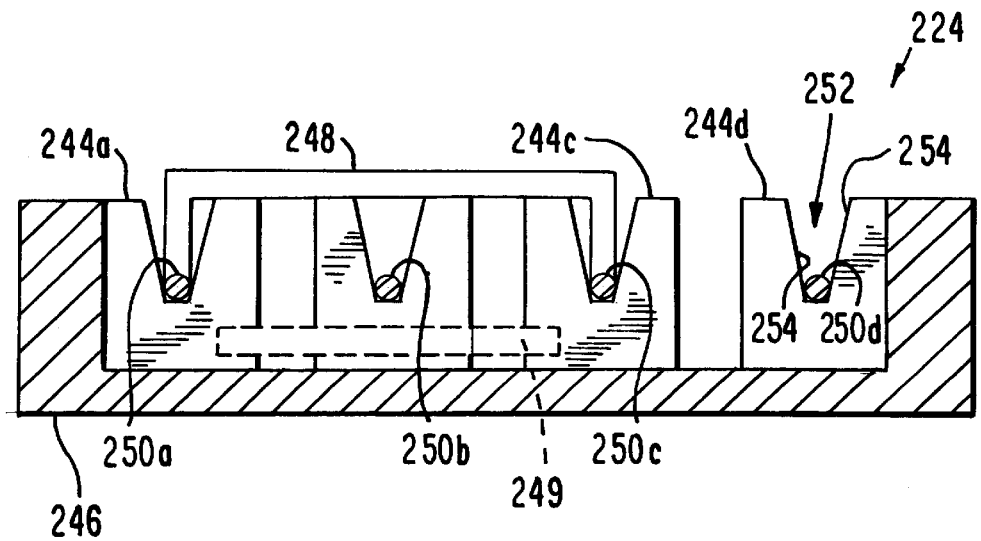

FIGS. 2A and 2B show an embodiment of terminal receiver 124 in accordance with the principles of the present invention. Terminal receiver 224 is preferably lightweight and includes a plurality of wire sockets 244a–d each preferably having a hollow housing mounted on, or integral with, a terminal base 246. Wire sockets 244a–d can be made of any appropriately rigid material (e.g., plastic), and can be of the MAG MATE type, which is known in the art. Alternatively, wire sockets 244a–d can be made of an electrically conductive material (e.g., copper), in which case, terminal base 246 is an electrically nonconducting base that prevents unintended electrical conduction between wire sockets 244a–d and their environment (e.g., when terminal receiver 224 is mounted to a conductive surface).

Wire leads 250a–d are inserted and retained in respective wire sockets 244a–d by inserting the wire down into and through slots 252. Angled upstanding sides 254 frictionally engage and retain a wire lead at or near the bottom of slot 252, but still allow the wire to slide through slot 252 when pulled either slightly upward to reduce the frictional engagement, with sufficient force, or both. Although four wire sockets are shown in FIGS. 2A and 2B for illustrative purposes only, terminal receiver 224 can include other numbers of wire sockets. Moreover, wire sockets of other types, configurations (e.g., 2×2 instead of 4 in a row), and orientations (e.g., angled 30° right or left from the vertical axis instead of aligned with the vertical axis as shown) also can be used if suitable for the stator being produced.

Optionally, a connecting strip 248, commonly known as a bridge, can be used to electrically interconnect wire leads of selected wire sockets. As shown in FIGS. 2A and 2B, connecting strip 248 electrically interconnects wire lead 250a with wire lead 250c. Alternatively, if wire sockets 244a–d are made of a conductive material, selected wire sockets 244a–d can be electrically interconnected with connecting strip 249 (shown in phantom). Moreover, if stator specifications are known sufficiently far in advance, terminal receiver 224 preferably can be provided with predetermined wire socket interconnections before the coil winding stage. In any case, such interconnections preferably always can be made after coil winding.

Connection terminals (not shown, but known in the art) can be inserted either from above or below terminal receiver 124 to electrically connect wire leads 250a–d to external conductors. Such connection terminals typically have probe-like structures that electrically contact the wire leads.

Alternatively, terminal receiver 124 can be other known final attachment devices comprising multiple electrical connection points to which multiple wire leads can be connected and at which electrical connections to said connected wire leads can be made.

FIG. 3 shows pallet 116 with coil insertion tool 102 and terminal receiver 124 at an insertion station. A stator core 356 is positioned on top of insertion blades 118. A pusher device 358 positioned below pallet 116 and aligned with the interior of insertion blades 118 inserts the coils by moving in direction 360 up through pallet 116 within the circumference of insertion blades 118. (Not shown, but known in the art, are pusher members that insert wedges over the inserted coils as part of the same insertion operation.)

If sufficient lead length was previously provided, terminal receiver 124 remains seated in seat 136 during coil insertion, as shown in FIG. 4. After coil insertion, wire lead lengths can be adjusted, if necessary, to a proper length by being pulled through their respective wire socket in direction 462 and cut appropriately.

Advantageously, should insufficient lead length have been previously provided, terminal receiver 124 can be left dangling alongside stator core 356 after having been pulled from seat 136 during coil insertion. The dangling terminal receiver 124 simply follows the stator core. This adds substantially no additional complexity to those stator production processes in which remaining process steps are predominantly manual. In any case, leads 140 and 142 remain connected to terminal receiver 124 during coil insertion and any subsequent transfer of stator core 356 in which terminal receiver 124 is left dangling.

After coils have been inserted in stator core 356, stator core 356 and terminal receiver 124 can be presented to a human operator or automated machinery where terminal receiver 124 need merely be mounted to a stator receiving stator core 356. In other words, unlike coil leads attached to an anchoring device, coil leads connected to a terminal receiver 124 generally do not have to be removed from that terminal receiver 124 to be reconnected elsewhere. Thus, post-coil-insertion lead identification and manipulation (e.g., routing, lacing, soldering, etc.) advantageously are for the most part, if not completely, unnecessary. For example, instead of identifying, bundling, and soldering together specified coil leads, those coil leads can be connected to wire sockets and interconnected via bridges within a single terminal receiver 124. External connections to those leads can then be made by connecting to that terminal receiver 124.

Note that in some cases, however, particular stator specifications may result in nonfinal wire lead connections to terminal receiver 124 (e.g., because of unavoidable wiring or routing conflicts). These connections are such that they cannot be made final until after coil insertion into a stator core. In these cases, affected wire leads can be easily identified, removed from their respective terminal receiver 124, rerouted, and reinserted in the same or different wire sockets of the same or different terminal receiver 124. This reconnection process advantageously can be done manually or automatically (upon proper positioning and securing of terminal receivers 124).

Stator production processes using terminal receivers 124 in accordance with the principles of the present invention have further advantages. For example, in those processes using an anchoring device to temporarily secure coil leads, such anchoring devices are usually returned to a winding station after removal of the coil leads at a station typically distant from the winding station. The present invention advantageously requires no such return process, nor does it incur any delays associated with such a return process.

Moreover, because terminal receiver 124 can be left dangling alongside stator cores after coil insertion, stator production processes of the present invention do not require the typically sophisticated equipment of known processes that transport both a stator core and an anchoring device to subsequent stations.

Still further, the present invention permits additional intermediate processes, such as, for example, forming end portions of inserted coils (e.g., vertically aligning coil end portions 464 and 466 with the sides of stator core 356). Such forming requires a stator core with an unobstructed interior passage for movement of a mandrel there through. Advantageously, because the invention routes coil leads to terminal receiver 124 around what will be the outside of a stator core, the coil leads do not obstruct the interior passage of the stator core.

Thus it is seen that methods and apparatus are provided that improve the efficiency of stator production by connecting coil leads to final attachment points before the coils are inserted into stator cores. One skilled in the art will appreciate that the present invention can be practiced by other than the described embodiments, which are presented for purposes of illustration and not of limitation, and the present invention is limited only by the claims that follow.

We claim:

1. Apparatus that produces a stator coil having wire leads connected to final attachment points, apparatus comprising:
   coil winding apparatus that winds wire into a coil, said winding apparatus comprising:
   a template around which wire is wound, and
   a nozzle for delivering wire wound around said template;
   a coil-holding tool that can receive a coil from said coil winding apparatus, said coil-holding tool comprising a plurality of circumferentially positioned members;
   a platform that supports said coil-holding tool;
   at least one final attachment device comprising a plurality of electrical connection points to which a plurality of wire leads can be connected before said coil is inserted into a stator core and at which electrical connections to said connected wire leads can be made, said connection points being final attachment points of said wire leads; and
   a lead gripper device comprising a wire handler that can grasp a wire from said nozzle and connect said grasped wire to one of said connection points of said final attachment device.

2. The apparatus of claim 1 wherein said final attachment device comprises a terminal receiver and said plurality of electrical connection points comprises a plurality of wire sockets that can receive and retain a plurality of wire leads and at which electrical connections to said retained wire leads can be made.

3. The apparatus of claim 2 further comprising a gripper device that can grasp and support said terminal receiver.

4. The apparatus of claim 1 wherein said platform rotates to align said final attachment device with said wire handler.

5. The apparatus of claim 1 wherein said platform comprises a pallet.

6. The apparatus of claim 1 wherein said coil-holding tool comprises a coil insertion tool.

7. The apparatus of claim 6 wherein said members of said coil insertion tool comprise upright regularly-spaced insertion blades.

8. The apparatus of claim 1 wherein said lead gripper device can move said wire handler in three dimensions and can rotate said wire handler about 360°.

9. The apparatus of claim 1 wherein said final attachment device is portable after a plurality of coil wire leads has been connected to said final attachment device.

10. The apparatus of claim 9 wherein said final attachment device sufficiently retains said connected coil wire leads such that said final attachment device can dangle via said connected coil wire leads without said dangling causing said connected coil wire leads to disconnect from said final attachment device.

* * * * *